United States Patent [19]
Staneck et al.

[11] 3,938,721
[45] Feb. 17, 1976

[54] PIN BELT MECHANISM FOR MOVEMENT OF A CONTINUOUS STRIP

[75] Inventors: Robert W. Staneck; George R. Spaleny, both of Dayton, Ohio

[73] Assignee: The Standard Register Company, Dayton, Ohio

[22] Filed: Aug. 19, 1974

[21] Appl. No.: 498,636

[52] U.S. Cl. ................................. 226/75; 352/183
[51] Int. Cl.² ....................................... G03B 1/30
[58] Field of Search .......... 226/74, 75, 59; 352/183

[56] References Cited
UNITED STATES PATENTS

| 2,313,888 | 3/1943 | Otis ................................ 226/75 X |
| 3,006,520 | 10/1961 | House ................................ 226/75 |
| 3,219,245 | 11/1965 | Manor ................................ 226/74 |
| 3,392,893 | 7/1968 | Bennett ................................ 226/74 |
| 3,693,856 | 9/1972 | Funk ................................ 226/74 |

*Primary Examiner*—Richard A. Schacher
*Attorney, Agent, or Firm*—Jacox & Meckstroth

[57] ABSTRACT

Pin belt mechanism for movement of a continuous strip or web which has pin feed holes. The belt is annular and the pins are attached thereto along the length thereof, between the side edges thereof. The pins are easily and readily inserted into the belt and removed therefrom. The belt is rotatable and during at least a portion of each revolution engages a ramp which accurately directs each pin into a hole in the web for movement of the web. Each pin, in a substantially vertical position, moves in a straight line as it assists in movement of the strip. The pin then smoothly moves from the hole without further engagement with the web during that rotative cycle of the belt.

Each pin has one end portion which constitutes a web drive portion and which engages the web for movement thereof. The other end of each pin is a belt drive portion as the belt drive portion of the pin is movable into a recess in a drive wheel so that the pin and the belt move substantially linearly with rotative movement of the drive wheel. The belt drive portion of each pin also moves within a slot in an idler wheel to maintain proper lateral positioning of the belt with respect to the idler wheel.

3 Claims, 9 Drawing Figures

U.S. Patent  Feb. 17, 1976  Sheet 1 of 2  3,938,721
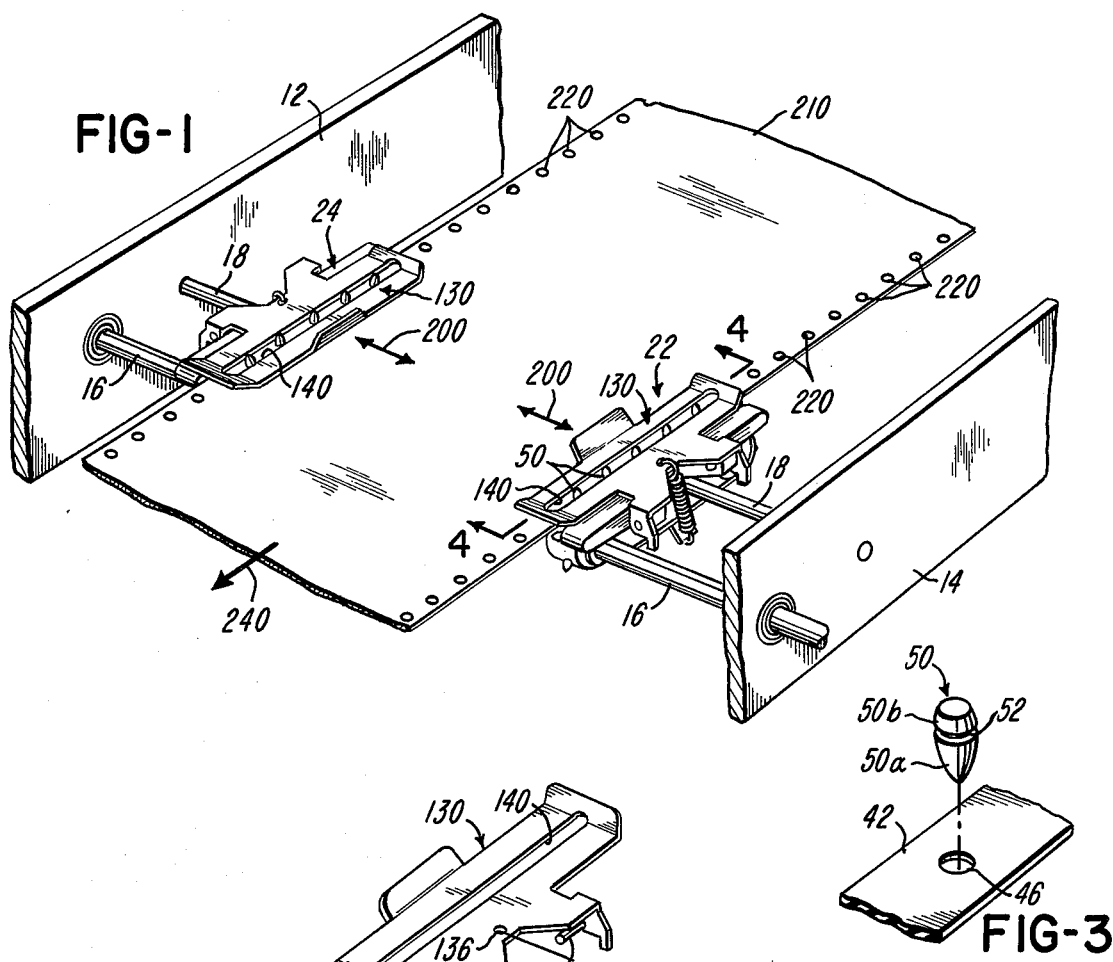
FIG-1
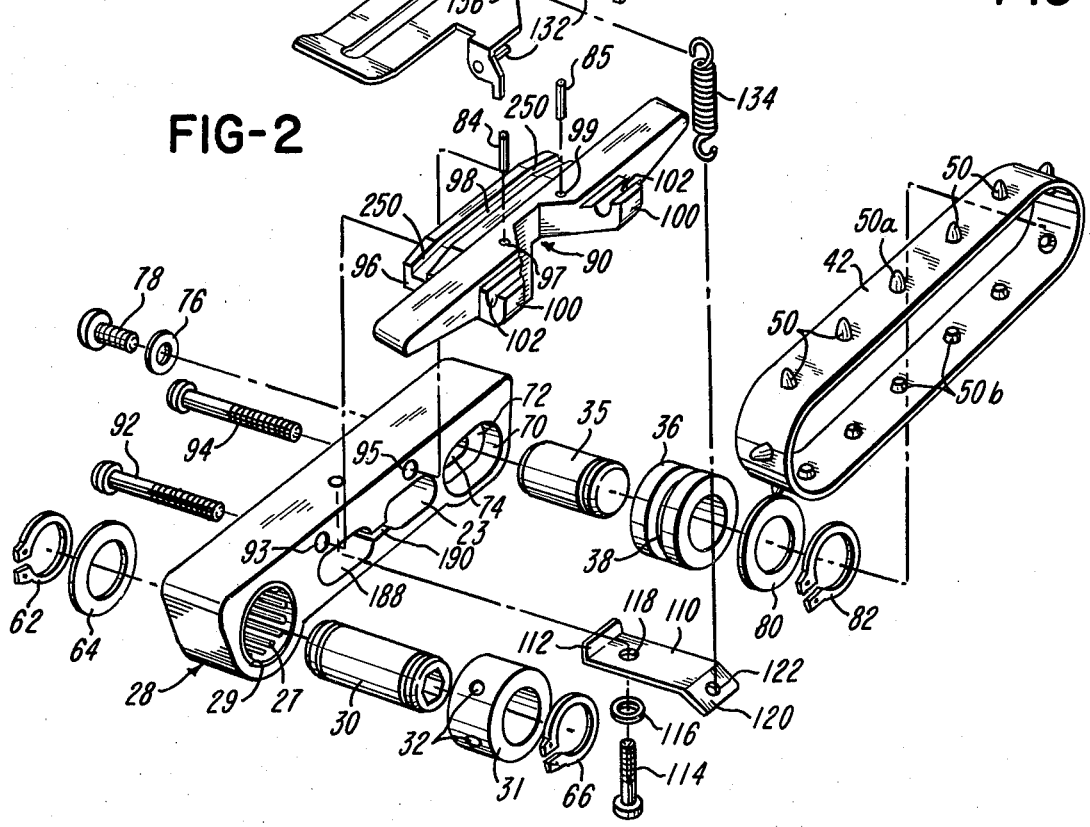
FIG-2
FIG-3

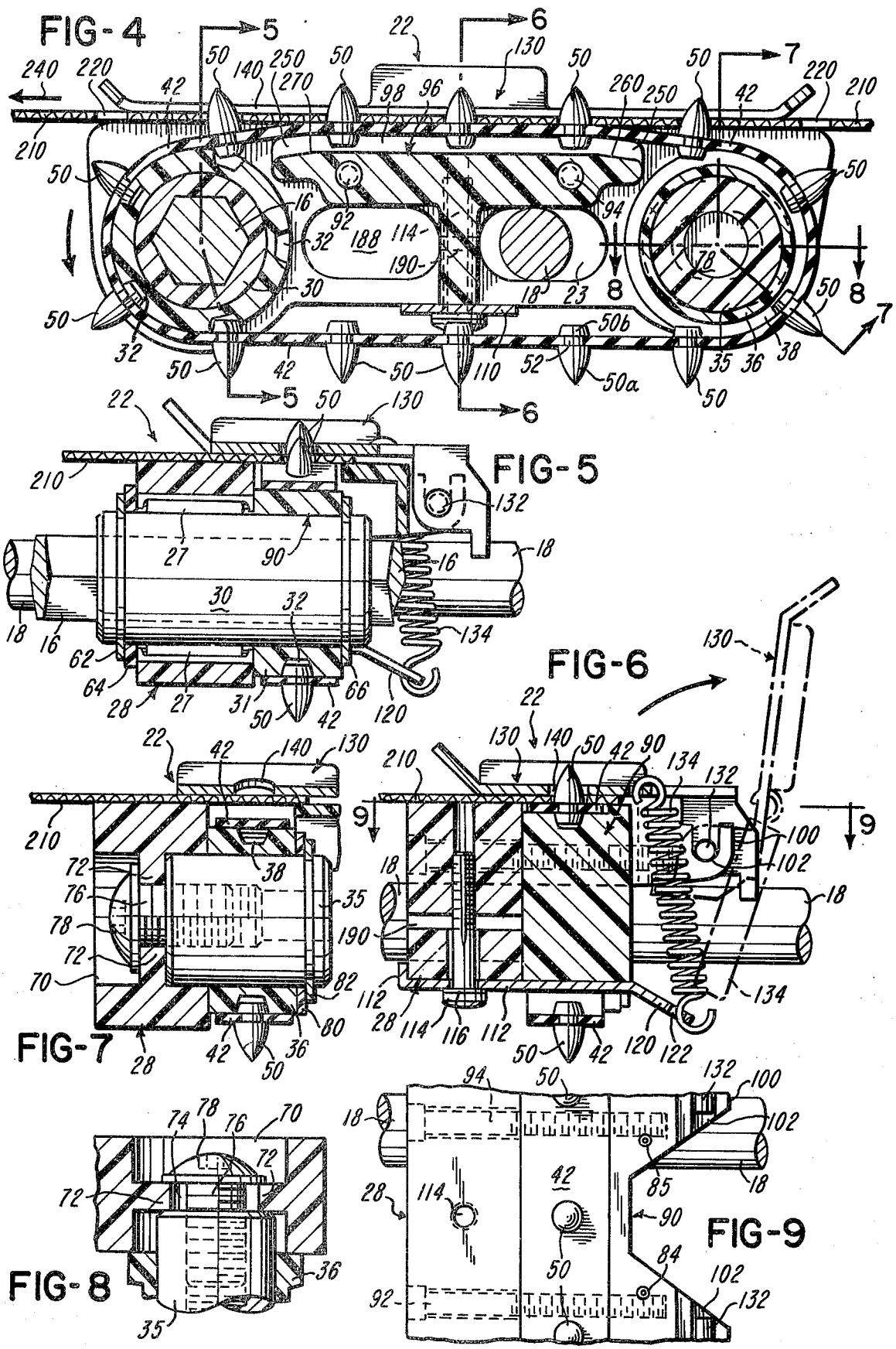

PIN BELT MECHANISM FOR MOVEMENT OF A CONTINUOUS STRIP

BACKGROUND OF THE INVENTION

The structure of this invention is related to our invention disclosed and claimed in U.S. Pat. No. 3,688,959. It is an object of this invention to provide pin belt mechanism for movement of a continuous strip or web which a belt and each pin thereof are easily and readily attached together to form a unit.

Another object of this invention is to provide such mechanism in which each pin member of the belt serves as a web drive member and also serves as a belt drive member.

Another object of the invention is to provide such mechanism in which each pin also serves to maintain proper lateral alignment of the belt.

Another object of this invention is to provide such mechanism which can be combined wth existing apparatus for movement of a continuous web or strip.

Another object of this invention is to provide such mechanism which can be constructed in compact physical size.

Another object of this invention is to provide such mechanism which can be easily readily adjusted to accommodate webs of various widths for movement thereof.

Another object of this invention is to provide such mechanism which has means for adjustment to accommodate belts of different lengths and for adjustment in the tension thereof.

Other objects and advantages of this invention reside in the construction of parts, the combination thereof, the method of manufacture, and the mode of operation, as will become more apparent from the following description.

BRIEF DESCRIPTION OF THE VIEWS OF THE DRAWINGS

FIG. 1 is a fragmentary perspective view, with parts broken away and shown in section, of pin belt mechanism of this invention.

FIG. 2 is a fragmentary exploded view, drawn on a larger scale than FIG. 1, showing a portion of the mechanism thereof.

FIG. 3 is a fragmentary exploded view, drawn on a larger scale than FIG. 2, of a portion of the mechanism thereof.

FIG. 4 is an enlarged sectional view, taken substantially on line 4—4 of FIG. 1.

FIG. 5 is a sectional view taken substantially on line 5—5 of FIG. 4.

FIG. 6 is a sectional view taken substantially on line 6—6 of FIG. 4.

FIG. 7 is a sectional view taken substantially on line 7—7 of FIG. 4.

FIG. 8 is a sectional view taken substantially on line 8—8 of FIG. 4.

FIG. 9 is a sectional view taken substantially on line 9—9 of FIG. 6.

DETAILED DESCRIPTION OF THE INVENTION

Strip feed mechanism of this invention may comprise an individual or unitary machine for movement of a continuous strip, or mechanism of this invention may be a part of apparatus which performs certain operations upon a continuous strip or web of material during travel thereof.

The strip feed meahanism of this invention is shown in FIG. 1 as being provided with a pair of spaced-apart support members 12 and 14. A drive shaft 16, herein shown as being hexagonal, is rotatably supported by the support members 12 and 14 and extends therebetween. A shaft 18, spaced from the shaft 16 and substantially parallel thereto, is non-rotatably supported by the support members 12 and 14 and extends therebetween.

Supported by the shafts 16 and 18 are a pair of drive units 22 and 24. The drive units 22 and 24 are similar one with respect to the other. The drive unit 22 is described below in detail. Corresponding reference numerals are applied to elements of the drive unit 24.

The drive unit 22 has a carriage 28, through which the shafts 16 and 18 extend. The shaft 18 extends through an elongate opening 23 in the carriage 28, as best shown in FIG. 4. The shaft 16 extends through a hexagonal opening in a drive sleeve 30 which is positioned within an opening 29 in the carriage 28. The sleeve 30 closely encompasses the shaft 16 for rotation therewith. The sleeve 30 is rotatably supported by a bearing 27 within the opening 29. The sleeve 30 is retained against axial movement by any suitable means, such as by a clip 62 and washer 64 at one end thereof. A wheel 31 encompasses the drive sleeve 30 and is secured thereto for rotation therewith. A clip 66 is attached to the sleeve 30 at the end thereof opposite the clip 62. The wheel 31 has a plurality of peripheral recesses 32.

Within an elongate slot 70 of the carriage 28, as best shown in FIG. 2, is a sleeve 35. As shown in FIG. 8, the elongate slot 70 has an internal wall 72 which is provided with an opening 74 therethrough. The stem 35 is internally threaded to receive a threaded stud 76 having a head 78. The stud 76 extends through the opening 74 and into the stem 35. Thus, the internal wall 72 supports the stem 35, as the internal wall 72 is clamped between the head 78 of the stud 76 and the stem 35, as illustrated in FIG. 8.

A wheel 36 is rotatable upon the stem 35 and is retained upon the stem 35 by a washer 80 and a clip 82, as illustrated by FIGS. 2 and 7. The wheel 36 has an annular groove or slot 38.

An annular flexible band 42, in the form of a belt or chain, or the like, encompasses the wheels 31 and 36. The belt 42 is preferably of elastomeric material. The belt 42 has a plurality of holes 46 therethrough, as illustrated in FIG. 3. A pin 50 extends through each hole 46. Each pin 50 is shown as having a tapered drive portion 50a at one end thereof and a base portion 50b at the other end thereof. Each pin 50 is attached to the belt 42 by forcing the pin 50 through a hole 46. The tapered portion 50a of each pin 50 is positioned at the outer surface of the belt 42, and the base 50b is positioned at the inner surface of the belt 42. Each pin 50 has an annular groove 52 intermediate the ends thereof, into which the portion of the belt 42 which encompasses the hole 46 is positioned. Thus, the intermediate portion of each pin 50 snugly fits within a hole 46 in the belt 42. The base 50b of each pin 50 has a shape which is complementary to the recesses 32 in the wheel 31. Each base 50b is also complementary in shape to the shape of the annular slot 38 in the wheel 36. Each pin 50 may be molded, or cast, or machined, or the like, and is preferably of a plastics material, such as "Delrin" or the like, having a low coefficient of friction. However, each pin 50 may be of steel or other metallic material.

The opening 74 in the internal wall 72 of the carriage 28 is larger than the stud 76, and the slot 70 is larger than the sleeve 35. Thus, by loosening the stud 76, the stem 35 may be shifted laterally to shift the wheel 36 toward or away from the wheel 31. This lateral adjustment of the stem 35 and the wheel 36 thus permits substitution of a belt 42 which may vary slightly in length. This lateral adjustment of the stem 35 and the wheel 36 also serves as means to tighten or loosen the tension in the belt 42.

The carriage 28 has attached thereto at one side thereof an elongate bracket 90. Threaded studs 92 and 94 extend through passages 93 and 95, respectively, in the carriage 28 and into the bracket 90, to attach the bracket 90 to the carriage 28. Pins 84 and 85 are positioned within passages 97 and 99 in the bracket 90 and engage the studs 92 and 94, respectively, as illustrated in FIG. 2, to retain the position of the studs 92 and 94 within the bracket 90.

At one side thereof the bracket 90 has a guide portion 96 provided with a guide channel 98 having sloping side walls 250. The guide channel 98 has a forward inclined portion 260 and a rear inclined portion 270, as shown in FIG. 4. At the other side thereof the bracket 90 has a pair of support portions 100, each of which has a groove 102.

The opening 23 in the carriage 28 through which the shaft 18 extends is in communication with an opening 188 through a slot 190 in the carriage 28, as illustrated in FIGS. 2, 4 and 6.

A rigid leaf 110, best shown in FIG. 2, is located on the bottom surface of the carriage 28 and has an upwardly extending flange 112 which engages the side surface of the carriage 28. A threaded stud 114, having a washer 116, extends upwardly through a hole 118 in the leaf 110 and into the carriage 28, through the slot 190, as best shown in FIGS. 1, 4, and 6, to attach the leaf 110 to the carriage 28. The leaf 110 has an angular end portion 120, having an aperture 122 therethrough.

A cover or cover plate 130 is adapted to cover the bracket 90. The cover 130 has a pair of coaxial stems 132, each of which rests in one of the grooves 102 of the bracket 90. A spring 134 has one end thereof within an aperture 136 in the cover 130 and the other end thereof within the aperture 122 in the leaf 120. Thus, the spring 134 retains the stems 132 within the grooves 102 and permits pivotal movement of the cover 130 about the axis of the stems 132.

The cover 130 has an elongate slot 140 which is directly above the guide channel 98, when the cover 130 is horizontal.

OPERATION

The drive units 22 and 24 are adjustably movable along the shafts 16 and 18. Thus, the drive units 22 and 24 may be moved one toward the other or one from the other, as illustrated by arrows 200 in FIG. 1. Thus, the drive units 22 and 24 are positionable to receive a continuous strip or web 210 which is of any reasonable width. The threaded stud 114, which extends through the slot 190 in the body of the carriage 28, not only retains the leaf 110 upon the carriage 28, but also serves as a clamping member. The stud 114 through the slot 190 determines the dimension of the slot 190 and thus determines top to bottom dimension of the opening 23 and thus determines the clamping force exerted upon the shaft 18 which extends through the opening 23 in the carriage 28. The clamping force permits movement of the drive units 22 and 24 with respect to the shafts 16 and 18. Each of the drive units 22 and 24 is adjustable to any desired position along the length of the shafts 16 and 18, and the clamping force exerted by the stud 114 retains the unit in adjusted position.

The continuous web or strip 210 has a row of feed holes 220 adjacent each of the edges thereof, as shown in FIG. 1. Each of the edges of the continuous strip or web 210 has a portion thereof between the cover 130 and the bracket 90 of one of the drive units 22 or 24, as shown in FIGS. 5 and 6. In positioning an edge portion of the web 210 between the cover 130 and the bracket 90, the cover 130 is pivotally moved upwardly as illustrated by broken lines in FIG. 6, and the edge portion of the web 210 is laid upon the bracket 90, with some of the pins 50 extending through some of the feed holes 220 of the web 210.

Then the cover 130 is pivotally moved into horizontal position above the bracket 90. In such position some of the pins 50 extend through the slot 140 in the cover 130. The base 50b of each of these pins 50 is positioned within the guide channel 98 of the bracket 90.

The base 50b of the feed pins 50 is movable within the annular slot 38 of the wheel 36. The base 50b of the pins 50 is also positionable within recesses 32 of the wheel 31, as the belt encompasses bracket 90 and the wheels 31 and 36.

The shaft 16 is rotated by any suitable motor means, not shown. Due to the fact that the wheel 31 of each of the drive units 22 and 24 is attached to the shaft 16, through the sleeve 30, for rotation therewith, the wheel 31 of each drive unit 22 and 24 rotates with rotation of the shaft 16.

Due to the fact that the base 50b of the pins 50 of the belt 42 becomes positioned in the recesses 32 of the wheel 31 during rotation of the wheel 31, the wheel 31 rotatively moves the belt 42 with rotation of the wheel 31. As the belt 42 rotatively moves, the base 50b of the feed pins 50 travels in the guide channel 98 of the bracket 90. The pins 50 also travel in the slot 38 of the wheel 36. As the belt 42 rotatively moves, the drive portion 50a of the pins 50 moves into holes 220 in the web 210 and moves the web 210 as illustrated by an arrow 240 in FIGS. 1 and 4.

As the belt 42 rotatively moves, the pins 50 move in seriatim relationship from the wheel 36 into the guide channel 98. The base 50b of each pin 50 engages the sloping side walls 250 of the inclined forward portion 260 of the guide channel 98 and moves thereupon. The angle of incline of the forward part 260 causes each pin 50 to move angularly in a manner to compensate for the difference between the pitch line of the belt 42 and the line of travel of the web 210. Thus, each pin 50 freely enters the feed holes 220 without distorting the web 210 adjacent the feed hole 220. Each pin 50, after movement into a feed hole 220 continues to move within the channel 98 and moves laterally into engagement with the web 210 at the forward part of its respective feed hole 220 and urges forward movement of the web 210. The base 50b of each pin 50 engages the sloping side walls 250 of the channel 98. As the base 50b of the pin 50 moves forwardly within the channel 98, the base 50b of the pin 50 begins to move downwardly within the rear portion 270 of the channel 98. Then after movement from the rear portion 270 of the channel 98, the base 50b of each pin 50 moves into a recess 32 of the wheel 31. Thus, each pin 50 freely and smoothly moves from its respective feed hole 220 without distortion of the web 210 during withdrawal of the pin 50.

The elongate opening 23 in the carriage 28 permits the carriage 28 to be accommodated by existing structure which may not have precise spacing between the shafts 16 and 18.

The elongate slot 70 in the carriage 28 and the opening 74 in the wall 72 therewithin permit the stud 76, the stem 35 and the wheel 36 to be moved laterally slightly to accommodate a belt 42 which may be of a slightly different circumference or to change the tension in a belt 42.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Mechanism for movement of a continuous strip provided with a longitudinal row of apertures comprising:
a pair of parallel shafts, there being a first shaft and a second shaft, the strip being arranged to move at right angles to the shafts, the shafts being longer in length than the width of the strip.
a carriage having an opening therethrough, the first shaft extending through the opening, the carriage being movable along the first shaft,
a drive wheel, the second shaft extending through the drive wheel for rotation of the drive wheel with rotation of the second shaft, the drive wheel being movable along the second shaft,
a second wheel rotatably carried by the carriage and spaced from both of the shafts,
a continuous belt encompassing the drive wheel and the second wheel for rotation therewith,
a plurality of pin members carried by the belt, each of the pin members extending through the belt and being movable with rotation of the belt,
the carriage having a second opening adjacent the first said opening, the openings being connected by a slot therebetween, a threaded stud extending into the carriage through the slot and having a head portion engageable with a portion of the carriage which is adjacent the slot, the threaded stud being rotatable to slightly move said portion of the carriage to change the dimension of the slot and to change the dimension of the openings, to provide a clamping pressure upon the shaft which extends through the first said opening.

2. Mechanism for movement of a continuous strip provided with a longitudinal row of apertures comprising:
a pair of parallel shafts, there being a first shaft and a second shaft, the strip being arranged to move at right angles to the shafts, the shafts being longer in length than the width of the strip,
a carriage having an opening therethrough, the first shaft extending through the opening, the carriage being movable along the first shaft,
a drive wheel, the second shaft extending through the drive wheel for rotation of the drive wheel with rotation of the second shaft, the drive wheel being movable along the second shaft,
a second wheel rotatably carried by the carriage and spaced from both of the shafts,
a continuous belt encompassing the drive wheel and the second wheel for rotation therewith,
a plurality of pin members carried by the belt, each of the pin members extending through the belt and being movable with rotation of the belt,
the carriage being provided with a recess having an internal wall provided with an elongate aperture therein, the mechanism including an internally threaded stem having a part within the recess and engaging the apertured wall, a stud extending through the aperture of the wall and into the internally threaded stem for clamping the stem with respect to the internal wall and thus retaining the stem with respect to the carriage, a part of the stem extending from the recess, the second wheel being rotatable upon said part of the stem which extends from the recess, the stem and the stud being laterally adjustably movable within the aperture of the internal wall to adjust the spacing between the second wheel and the drive wheel.

3. Mechanism for movement of a continuous strip provided with a longitudinal row of apertures comprising:
a pair of parallel shafts, there being a first shaft and a second shaft, the strip being arranged to move at right angles to the shafts, the shafts being longer in length than the width of the strip.
a carriage having an opening therethrough, the first shaft extending through the opening, the carriage being movable along the first shaft,
a drive wheel, the second shaft extending through the drive wheel for rotation of the drive wheel with rotation of the second shaft, the drive wheel being movable along the second shaft,
a second wheel rotatably carried by the carriage and spaced from both of the shafts,
a continuous belt encompassing the drive wheel and the second wheel for rotation therewith,
a plurality of pin members carried by the belt, each of the pin members extending through the belt and being movable with rotation of the belt,
the pin members of the belt being movable into the apertures of the continuous strip,
the carriage having a second opening adjacent the first said opening, the openings being connected by a slot therebetween, means extending into the carriage through the slot and engageable with a portion of the carriage which is adjacent the slot, said means being adjustable to slightly move said portion of the carriage to change the dimension of the slot and to change the dimension of the openings, to provide a clamping pressure upon the shaft which extends through the first said opening.

* * * * *